(12) United States Patent
Giraud

(10) Patent No.: US 9,557,024 B2
(45) Date of Patent: Jan. 31, 2017

(54) LIGHT GUIDE FOR AN OPTICAL DEVICE, NOTABLY FOR LIGHTING AND/OR SIGNALING

(71) Applicant: Valeo Vision, Bobigny (FR)

(72) Inventor: Sylvain Giraud, La Fleche (FR)

(73) Assignee: Valeo Vision, Bobigny (FR)

( * ) Notice: Subject to any disclaimer, the term of this patent is extended or adjusted under 35 U.S.C. 154(b) by 287 days.

(21) Appl. No.: 14/091,536

(22) Filed: Nov. 27, 2013

(65) Prior Publication Data

US 2014/0146554 A1    May 29, 2014

(30) Foreign Application Priority Data

Nov. 29, 2012 (FR) ...................... 12 61426

(51) Int. Cl.
  *F21S 8/10*  (2006.01)
  *F21V 8/00*  (2006.01)

(52) U.S. Cl.
  CPC .............. *F21S 48/00* (2013.01); *F21S 48/215* (2013.01); *F21S 48/2243* (2013.01); *F21S 48/2262* (2013.01); *F21S 48/2281* (2013.01); *G02B 6/0001* (2013.01); *G02B 6/002* (2013.01); *G02B 6/0045* (2013.01); *G02B 6/0031* (2013.01)

(58) Field of Classification Search
  CPC ....................................................... G01D 5/28
  USPC .......................... 362/551, 23.09, 23.1, 23.16, 23.17, 362/249.07
  See application file for complete search history.

(56) References Cited

U.S. PATENT DOCUMENTS

| 5,515,244 A | * | 5/1996 | Levins | .................. G06F 1/1601 116/202 |
| 5,857,770 A | * | 1/1999 | Fohl | ..................... F21S 48/2243 362/259 |
| 7,513,672 B2 | * | 4/2009 | Parker | .................. G02B 6/0018 362/23.01 |
| 8,434,892 B2 | | 5/2013 | Zwak et al. | |
| 2006/0238720 A1 | | 10/2006 | Lee et al. | |

(Continued)

FOREIGN PATENT DOCUMENTS

EP    1718084    11/2006
JP    H11260136   9/1999

(Continued)

*Primary Examiner* — Renee Chavez
*Assistant Examiner* — Christopher E Dunay
(74) *Attorney, Agent, or Firm* — Jacox, Meckstroth & Jenkins

(57) ABSTRACT

A light guide for an optical device, notably for lighting and/or signaling, comprising:
  at least one light output portion having a top face and a bottom face linked together by a light output rim,
  at least one collimation subassembly suitable for receiving light emitted by a light source and for directing at least a part of this light toward the light output portion, the collimation subassembly having a top face and a bottom face linked together by a rim, and
  a coupling portion coupling the light output portion to the subassembly, the coupling portion having a top face and a bottom face,
  the bottom and top faces of the collimation subassembly extend substantially in mutually parallel planes, and in that the top face of the coupling portion and at least one of the top face of the collimation subassembly and of the top face of the light output portion meet at an edge.

20 Claims, 3 Drawing Sheets

(56) References Cited

U.S. PATENT DOCUMENTS

Figure 1:
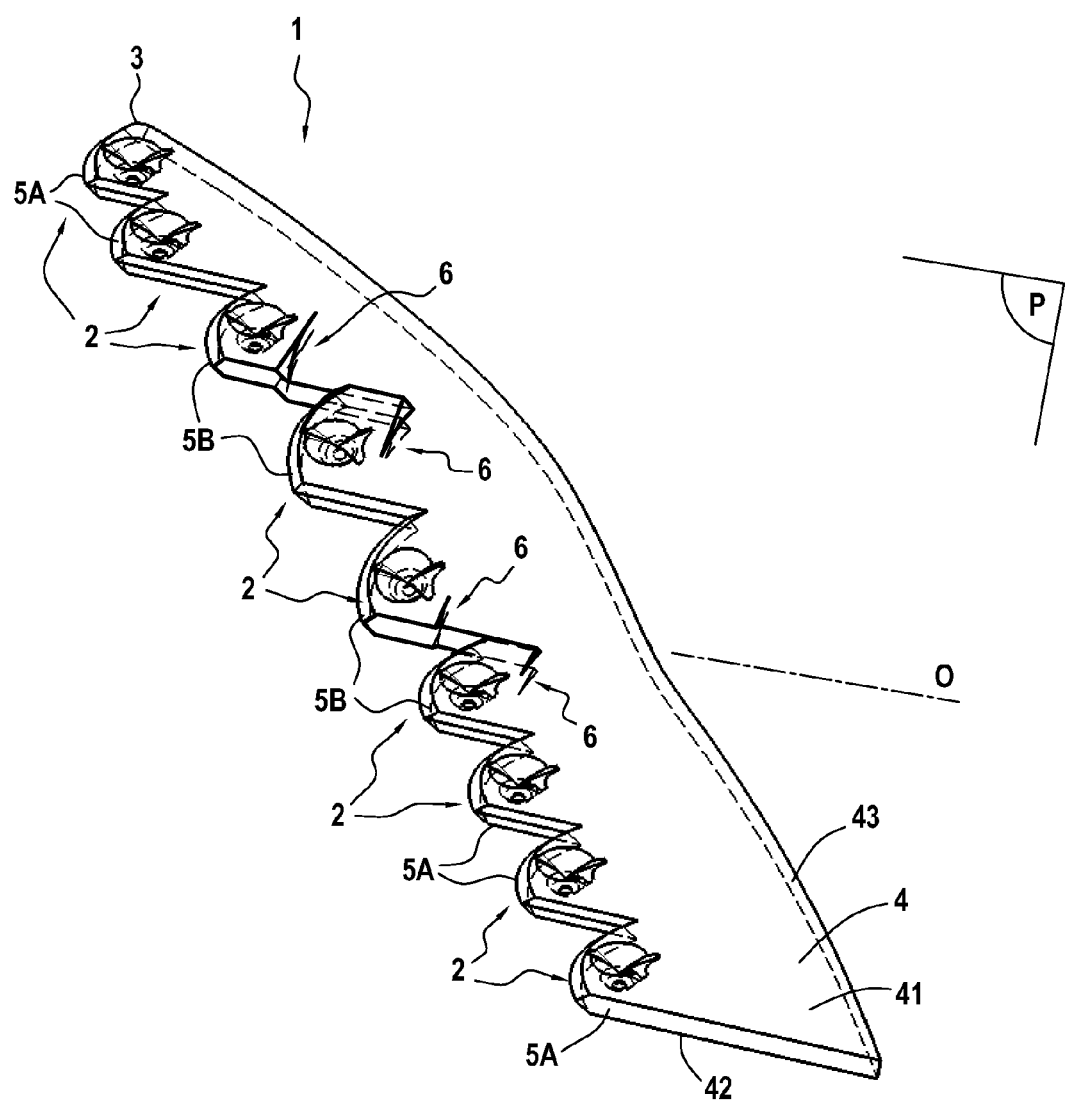

| | | | |
|---|---|---|---|
| 2010/0091498 A1* | 4/2010 | Bierhuizen | G02B 6/0028 |
| | | | 362/268 |
| 2012/0218722 A1* | 8/2012 | Yu | F16M 11/041 |
| | | | 361/747 |
| 2012/0250308 A1 | 10/2012 | Zwak et al. | |
| 2014/0177255 A1* | 6/2014 | Gebauer | F21S 48/00 |
| | | | 362/516 |
| 2014/0204600 A1* | 7/2014 | Bungenstock | F21S 48/234 |
| | | | 362/511 |
| 2015/0003092 A1* | 1/2015 | Gebauer | F21S 48/215 |
| | | | 362/511 |
| 2015/0003094 A1* | 1/2015 | Gebauer | G02B 6/0018 |
| | | | 362/511 |
| 2015/0003095 A1* | 1/2015 | Gebauer | F21S 48/225 |
| | | | 362/511 |

FOREIGN PATENT DOCUMENTS

| | | |
|---|---|---|
| JP | 2007335312 | 12/2007 |
| WO | 2011051563 | 5/2011 |

* cited by examiner

LIGHT GUIDE FOR AN OPTICAL DEVICE, NOTABLY FOR LIGHTING AND/OR SIGNALING

CROSS-REFERENCE TO RELATED APPLICATIONS

This application claims priority to French Application No. 1261426 filed Nov. 29, 2012.

BACKGROUND OF THE INVENTION

1. Field of the Invention

The invention relates to a light guide for an optical device, notably a lighting or signaling or interior lighting device.

2. Description of the Related Art

It is known practice to provide the lighting and/or signaling devices with a light guide in the form of a non-planar sheet and light-emitting diodes whose light rays are guided by the light guide to the output of the device. A light beam is thus created using a light guide whose appearance when switched on is curved.

In order to direct the light beam emitted by the guide in certain directions, it is known practice to provide such guides with collimation subassemblies suitable for receiving light emitted by a light-emitting diode and for directing a part of this light toward the output of the device.

Now, the form of such subassemblies has to be adapted to the curvature of the sheet, for example by bending the subassemblies.

This adaptation leads to the drawback of degrading the appearance of the light guide when switched on, which can appear uneven, even discontinuous along the curved profile.

In addition, such curved subassemblies are complicated to design.

SUMMARY OF THE INVENTION

One aim of the invention is to produce a light guide that makes it possible to mitigate these drawbacks.

Thus, the subject of the invention is a light guide for an optical device, notably for lighting and/or signaling, comprising:
  at least one light output portion having a top face and a bottom face linked together by a light output rim,
  at least one collimation subassembly suitable for receiving light emitted by a light source and for directing at least a part of this light toward the light output portion, the collimation subassembly having a top face and a bottom face linked together by a rim, and
  a coupling portion coupling the light output portion to the subassembly, the coupling portion having a top face and a bottom face,
  wherein the bottom and top faces of the subassembly extend substantially in mutually parallel planes, and in that the top face of the coupling portion and at least one of the top face of the collimation subassembly and of the top face of the light output portion meet at an edge.

By virtue of the invention, it is possible to do away with any deformation of the collimation subassembly and consequently to retain an optimum distribution of the light rays toward the light output rim and therefore enhance the uniformity of the light beam reaching the output face.

Furthermore, because of the flatness of the top and bottom faces of the subassembly, the guide according to the invention can be produced simply.

According to one embodiment of the invention, when a light ray arrives on the bottom face of the coupling portion with a given direction of incidence, the top and bottom faces of the coupling portion are arranged in such a way as to reflect this ray, notably by total internal reflection, toward the light output portion in a direction of reflection substantially parallel to the given direction of incidence.

"Direction of incidence" should be understood to mean the angle of incidence of the ray on the bottom face of the coupling portion and "direction of reflection" should be understood to mean the angle of reflection of the ray on the top face of the coupling portion. By virtue of this feature, the light rays that are propagated in the guide pass from the collimation subassembly to the output portion by retaining their direction, despite the curvature of the sheet. In this way, the uniformity of the light beam reaching the output face is enhanced.

As a variant, when a light ray arrives on the top face of the coupling portion with a given direction of incidence, the top and bottom faces of the coupling portion are arranged in such a way as to reflect this ray, notably by total internal reflection, toward the light output portion in a direction of reflection substantially parallel to the given direction of incidence.

Advantageously, the top face of the coupling portion and the top face of the collimation subassembly meet at a first edge, and the top face of the coupling portion and the top face of the output portion meet at a second edge.

If necessary, the first edge defines the apex of an angle formed by the top face of the coupling portion and the top face of the collimation subassembly. Preferentially, this angle is between 130° and 160°, is even equal to 135°.

The second edge defines the apex of an angle formed by the top face of the coupling portion and the top face of the output portion. Preferentially, this angle is between 130° and 160°, is even equal to 135°.

Advantageously, the first edge forms a straight segment.

Also advantageously, the top face of the coupling portion is planar.

According to one feature of the invention, the bottom face of the coupling portion and at least one of the bottom face of the collimation subassembly and of the bottom face of the light output portion meet at an edge.

Advantageously, the bottom face of the coupling portion and the bottom face of the collimation subassembly meet at a third edge, and the bottom face of the coupling portion and the bottom face of the output portion meet at a fourth edge.

If necessary, the third edge defines the apex of an angle formed by the bottom face of the coupling portion and the bottom face of the collimation subassembly. Preferentially, this angle is between 130° and 160°, is even equal to 135°.

The fourth edge defines the apex of an angle formed by the bottom face of the coupling portion and the bottom face of the output portion. Preferentially, this angle is between 130° and 160°, is even equal to 135°.

Advantageously, the third edge forms a straight segment.

Also advantageously, the bottom face of the coupling portion is planar.

Preferentially, the top and bottom faces of the coupling portion are mutually parallel.

According to an advantageous feature of the invention, the top face of the coupling portion exactly covers the bottom face of the coupling portion. Advantageously, the bottom face of the coupling portion is, over its entire surface, facing the top face of the coupling portion. For example, provision can be made for the first edge and the third edge to be included in one and the same plane at right angles to the collimation subassembly. Provision can also be made for the second edge and the fourth edge to be included in one and the same cylinder defined by a translational generatrix on a directrix, the generatrix being a straight line at right angles to the collimation subassembly and the directrix being the second edge.

In another embodiment of the invention, the top face of the coupling portion is offset relative to the bottom face of the coupling portion. The first edge and the third edge are included in one and the same plane inclined relative to the collimation subassembly. The second edge and the fourth edge are included in one and the same cylinder defined by a translational generatrix on a directrix, the generatrix being a straight line secant to the collimation subassembly and the directrix being the second edge.

The guide according to the invention will also be able to have, optionally, at least one of the following features:
- the bottom face of the collimation subassembly is a light input face suitable for receiving light emitted by a light source,
- the collimation subassembly comprises collimation means for directing at least a part of the light originating from the bottom face of the collimation subassembly toward the coupling portion,
- when rays are emitted from a predetermined point relative to the guide, pass through the input face and arrive on these collimation means, the collimation means are arranged to direct, directly or indirectly, a majority, notably all, of these rays toward the coupling portion in the form of a beam with parallel rays, or rays that are approximately parallel to within 5°. In other words, the majority, even all, of the rays emitted from a predetermined point, that pass through the input face and arrive on the collimation means are directed in such a way as to be contained in mutually parallel planes and the majority, even all, of the rays contained in one of these planes are mutually parallel. This feature offers the advantage of being able to direct the light beam leaving the guide in a predetermined direction, for example to meet current regulations,
- the guide comprising an optical axis, the direction of the rays of the beam with parallel rays is substantially parallel to the optical axis of the guide,
- the collimation means comprise a coupler arranged in such a way that, when rays are emitted from a predetermined point relative to the guide, pass through the input face and arrive on this coupler, a part of these rays are reflected by the coupler toward the coupling portion and another part of these rays are reflected by the coupler toward the rim of the collimation subassembly,
- the rim of the collimation subassembly is a reflection face having a section of parabolic form in a plane parallel to the top face of the subassembly, the focal point of this section of parabolic form being positioned at the level of the coupler. In this way, the coupler transmits a part of the light to the rim of the subassembly which redirects it, in the form of a beam with parallel rays,
- the rim of the collimation subassembly has a section of V form in a plane at right angles to the top face of the subassembly and containing the optical axis, the rim being formed by two surfaces forming between them an angle of 90°. Thus, these two surfaces can operate with total internal reflection of the light rays, which makes it possible to dispense with aluminizing the rim of the subassembly,
- the light output portion forms a guiding sheet arranged to guide, toward the output rim, light coming from the coupling portion and being propagated in the sheet, notably by total internal reflection. A sheet denotes a solid whose thickness, for example measured between the top and bottom faces, is substantially smaller than dimensions, such as the length or the width, of these top and bottom faces. The guiding sheet is produced from a transparent material with a refractive index greater than the refractive index of the medium in which the guide is intended to be immersed, for example air. Thus, a light ray introduced into the thickness of the sheet encounters the top or bottom faces with an angle of incidence relative to the normal which is greater than a limiting refraction angle. The ray is then likely to be reflected totally by the top and bottom faces. The light ray is therefore guided in the thickness of the guiding sheet by successive reflections between the two guiding faces,
- the output portion has a curved form. This means that the top face and/or the bottom face of the output portion is not entirely contained in a plane,
- the top face of the output portion has a cylindrical form. In this case, the directrix of the top face is a curve portion,
- the bottom face of the output portion has a cylindrical form. In this case, the directrix of the bottom face is a curve portion,
- the thickness of the sheet is substantially constant at any point of the output portion. "Thickness" should be understood to mean the distance separating the top face of the output portion and the bottom face of the output portion measured in a plane at right angles to the top face,
- the thickness of the output portion is substantially equal to the thickness of the collimation subassembly,
- the guide having an optical axis, in a section of the guide through a plane at right angles to the top face of the output portion passing through the optical axis, the top face of the output portion is parallel to the top face of the collimation subassembly,
- in a section of the guide through a plane at right angles to the top face of the output portion passing through the optical axis, the bottom face of the output portion is parallel to the bottom face of the collimation subassembly,
- the output rim comprises means for diffusing the light leaving this output rim. If necessary, the output rim can exhibit striations, prisms or toroids,
- the guide comprises a plurality of collimation subassemblies,
- the guide comprises a single light output portion and a plurality of coupling portions, each coupling portion coupling one of the subassemblies to the light output portion,
- the top face of the light output portion and the output face meet at a top output rim edge, the bottom face of the light output portion and the output face meet at a bottom output rim edge, the top output rim edge and/or the bottom output rim edge has a curved and smooth, that is to say unbroken, profile,
- at least a part of the bottom faces of the collimation subassemblies extends in one and the same first plane and at least one other part of the bottom faces of the collimation subassemblies extends in one and the same second plane, the first and second planes being distinct,
- the bottom faces of the subassemblies extend in mutually parallel planes, the bottom faces of the subassemblies extend in one and the same plane, the guide is monolithic, notably by molding of a plastic material.

Another subject of the invention is an optical device, notably for a motor vehicle, such as a lighting or signaling device, or a device for lighting the interior of the vehicle passenger compartment, comprising:

at least one light source, at least one light guide according to the invention.

In one embodiment of the invention, the light source is a light-emitting diode.

If so desired, the device comprises a plurality of light sources arranged to light the light guide.

Advantageously, each light source is associated with a different subassembly. That is to say that each collimation subassembly is able to receive light emitted by just one of the light sources and to direct at least a part of this light toward the light output portion.

In an exemplary implementation of the invention, the device is arranged to emit, through the output face of the light guide, a light with a light intensity of between 50 candelas and 1200 candelas.

The optical device can, for example, fulfill a function of DRL (Daytime Running Light) type, of Stop type, of fog lamp type, of direction indicator type or of reversing light type.

These and other objects and advantages of the invention will be apparent from the following description, the accompanying drawings and the appended claims.

BRIEF DESCRIPTION OF THE ACCOMPANYING DRAWINGS

Figure 2:
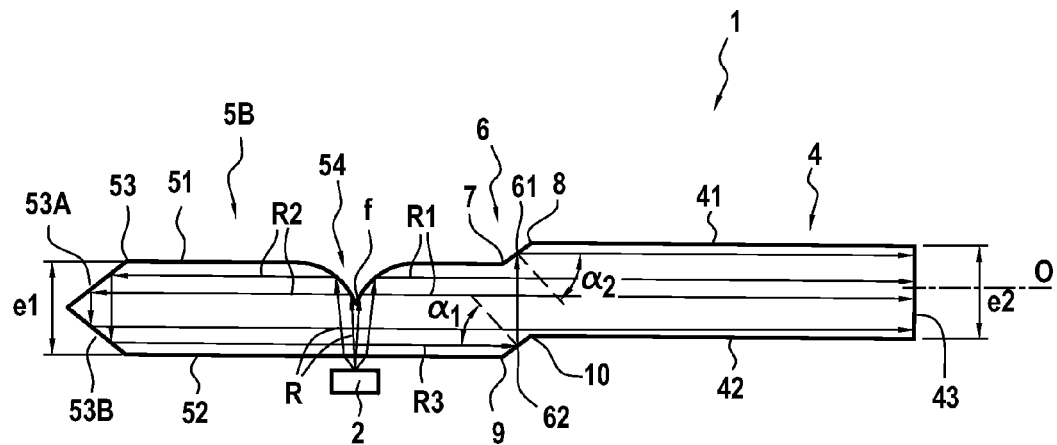
Figure 3:
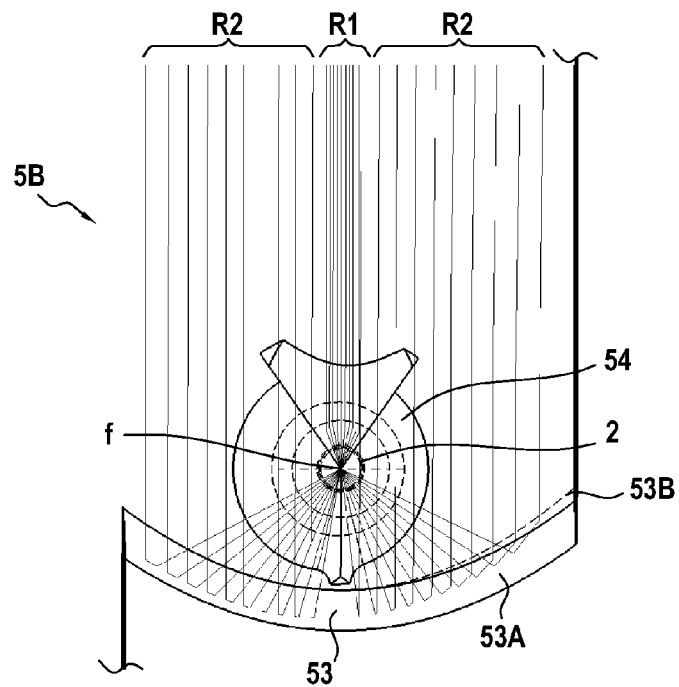
Figure 4A:
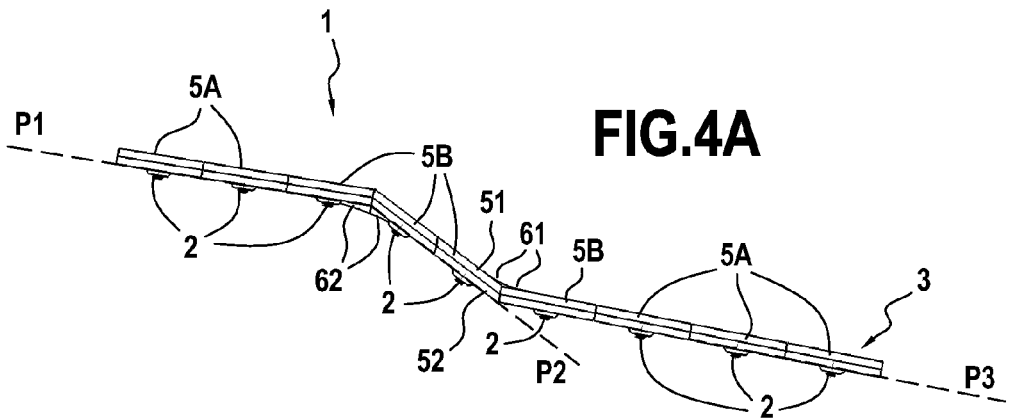
Figure 4B:
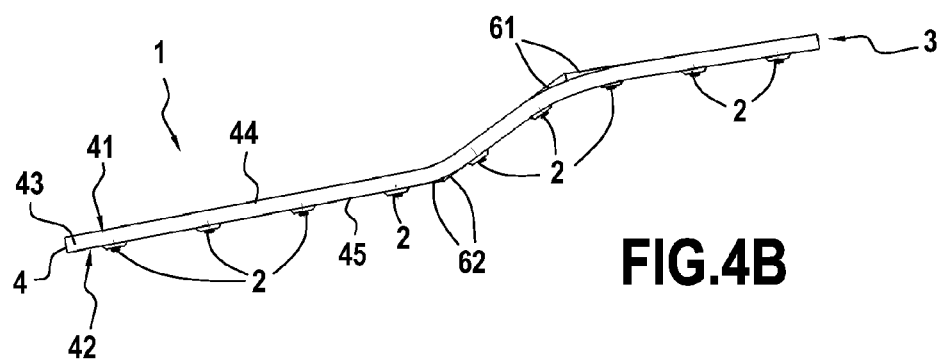
Figure 5:
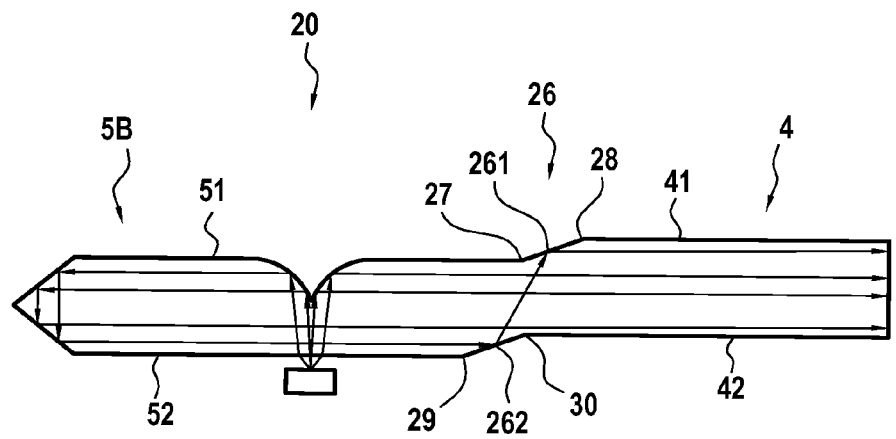

The invention will be able to be better understood on reading the following detailed description, of nonlimiting examples of implementation of the invention, and on studying the appended drawing, in which:

FIG. 1 schematically and partially illustrates, in perspective, an optical device according to an exemplary implementation of the invention;

FIG. 2 schematically and partially represents a cross section of the device of FIG. 1;

FIG. 3 schematically and partially represents, in plan view, a collimation subassembly and an LED of the device of FIG. 1;

FIGS. 4A and 4B schematically and partially represent rear and front views of the device of FIG. 1; and FIG. 5 schematically and partially represents a cross section of a device according to another exemplary implementation of the invention.

DETAILED DESCRIPTION OF THE PREFERRED EMBODIMENTS

FIG. 1 shows an optical device 1 for a motor vehicle, such as a signaling device suitable for fulfilling a function of the DRL type.

The optical device 1 comprises:

a plurality of light sources 2, each light source 2 being formed by a light-emitting diode, or LED, a light guide 3 having an optical axis O.

The light guide 3 comprises:

a light output portion 4 having a top face 41 and a bottom face 42 linked together by a light output rim 43, a plurality of collimation subassemblies 5A and 5B, and a plurality of coupling portions 6 coupling the light output portion 4 to a subassembly 5B.

Each LED 2 is associated with a subassembly 5A or 5B. That is to say that each collimation subassembly 5A or 5B is suitable for receiving light emitted by an LED 2 and for directing at least a part of this light toward the light output portion 4.

The subassemblies 5A and 5B are all substantially identical.

FIG. 2 shows a section of the device 1 of FIG. 1 through a plane P at right angles to the top face 41 of the device 1 and containing the optical axis O, and FIG. 3 shows a plan view of a collimation subassembly 5B and of an LED 2 associated with this collimation subassembly 5B of the device 1 of FIG. 1.

The subassembly 5B has a top face 51 and a bottom face 52 linked together by a rim 53.

The bottom 52 and top 51 faces of the subassembly 5B extend substantially in mutually parallel planes.

The bottom face 52 of the collimation subassembly 5B is a light input face 52 suitable for receiving light emitted by the LED 2 when this LED 2 is positioned under the collimation subassembly 5B.

The top face 51 of the collimation subassembly 5B comprises a coupler 54 arranged in such a way that, when the LED 2 is positioned vertically to this coupler 54 and when rays R are emitted from a point of this LED 2, pass through the input face 52 and arrive on this coupler 54, a part R1 of these rays R are reflected by the coupler 54 in a beam with substantially parallel rays R1 toward the coupling portion 6 and another part R2 of these rays are reflected by the coupler 54 toward the rim 53 of the collimation subassembly 5B.

The rim 53 of the collimation subassembly 5B is a reflection face having a section of parabolic form in a plane parallel to the top face 51 of the subassembly 5B. The focal point f of this section of parabolic form is positioned at the level of the coupler 54. In this way, the coupler 54 transmits the part R2 of the light to the rim 53 of the subassembly 5 which redirects it, in the form of a beam with substantially parallel rays R2, toward the coupling portion 6.

Furthermore, the rim 53 of the collimation subassembly 5B is formed by two surfaces 53A and 53B forming between them an angle of 90°. These two surfaces 53A and 53B can thus operate with total internal reflection of the light rays R2.

The coupling portion 6 has a planar top face 61 and a planar bottom face 62. These top 61 and bottom 62 faces are mutually parallel.

The top face 61 of the coupling portion 6 and the top face 51 of the collimation subassembly 5B meet at a first edge 7, and the top face 61 of the coupling portion 6 and the top face 41 of the output portion 4 meet at a second edge 8.

The first edge 7 forms a straight segment.

The bottom face 62 of the coupling portion 6 and the bottom face 52 of the collimation subassembly 5B meet at a third edge 9, and the bottom face 62 of the coupling portion 6 and the bottom face 42 of the output portion 4 meet at a fourth edge 10.

The third edge 9 forms a straight segment.

The bottom face 62 of the coupling portion 6 is, over its entire surface, facing the top face 61 of the coupling portion 6. The first edge 7 and the third edge 9 are included in one and the same plane at right angles to the collimation subassembly, which is not represented. The second edge 8 and the fourth edge 10 are included in one and the same cylinder, which is not represented, defined by a translational generatrix on a directrix, the generatrix being a straight line at right angles to the collimation subassembly and the directrix being the second edge 8.

The first edge 7 defines the apex of an angle formed by the top face 61 of the coupling portion 6 and the top face 51 of the collimation subassembly 5B. This angle is equal to 135°.

The second edge 8 defines the apex of an angle formed by the top face 61 of the coupling portion 6 and the top face 41 of the output portion 4. This angle is equal to 135°.

The third edge 9 defines the apex of an angle formed by the bottom face 62 of the coupling portion 6 and the bottom face 52 of the collimation subassembly 5B. This angle is equal to 135°.

The fourth edge 10 defines the apex of an angle formed by the bottom face 62 of the coupling portion 6 and the bottom face 42 of the output portion 4. This angle is equal to 135°.

When a light ray R3 of the beams with parallel rays R1 or R2 arrives on the bottom face 62 of the coupling portion 6 with a given direction of incidence $\alpha_1$, this ray R3 is successively reflected, notably by total internal reflection, by the bottom face 62 and by the top face 61 toward the light output portion 4 in a direction of reflection $\alpha_2$ substantially parallel to the direction of incidence $\alpha_1$.

By virtue of this feature, the light rays R1, R2 and R3 being propagated in the guide pass from the collimation subassembly 5B to the output portion 4 while retaining their direction.

The light output portion 4 forms a guiding sheet 4 made of PMMA with a refractive index of 1.49 or of PC with a refractive index of 1.59.

In the example described, the guide 3 is monolithic.

The light rays R1, R2 and R3 are guided in the sheet 4 toward the light output rim 43, directly or by successive total internal reflections between the top 41 and bottom 42 faces of the sheet 4.

The output portion 4 has a curved form. That is to say that the top face 41 and/or the bottom face 42 of the output portion 4 is not entirely contained in a plane.

In the example described, the top faces 41 and 42 of the output portion 4 each have a cylindrical form whose directrix is a curve portion.

The thickness $e_1$ of the sheet is substantially constant at any point of the output portion and is substantially equal to the thickness $e_2$ of the collimation subassemblies 5A and 5B.

In order to better understand the invention, FIG. 4A shows a rear view of the device 1 of FIG. 1 and FIG. 4B shows a front view of the device 1 of FIG. 1.

These FIGS. 4A and 4B show, notably, the flatness of the top 51 and bottom 52 faces of the collimation subassemblies 5A and 5B, the curvature of the light output portion 4 of the device and the top 61 and bottom 62 faces of the coupling portions 6 in the curved areas of the output portion 4.

A first part of the bottom faces 52 of the collimation subassemblies 5A and 5B extends in one and the same first plane P1; a second part of the bottom faces 52 of the collimation subassemblies 5B extends in one and the same second plane P2; and a third part of the collimation subassemblies 5A and 5B extends in one and the same third plane P3.

The first plane P1, the second plane P2 and the third plane P3 are distinct.

The first plane P1 and the third plane P3 are mutually parallel.

The top face 41 of the light output portion 4 and the output face 43 meet at a top output rim edge 44. The bottom face 42 of the light output portion 4 and the output face 43 meet at a bottom output rim edge 45. The top output rim edge 44 and the bottom output rim edge 45 have a curved and smooth, that is to say unbroken, profile.

Obviously, numerous modifications will be able to be made to the invention without departing from the framework thereof.

It is possible, for example, to replace the collimation subassemblies 5A and 5B with other elements making it possible to direct the light emitted by the LEDs 2 toward the light output portion 4.

FIG. 5 shows a cross section of a device 20 according to the invention, similar to the device 1 of FIGS. 1 and 2, except for the coupling portion 26.

The coupling portion 26 has a planar top face 261 and a planar bottom face 262. These top 261 and bottom 262 faces are mutually parallel.

The top face 261 of the coupling portion 26 and the top face 51 of the collimation subassembly 5B meet at a first edge 27, and the top face 261 of the coupling portion 26 and the top face 41 of the output portion 4 meet at a second edge The first edge 27 forms a straight segment.

The bottom face 262 of the coupling portion 26 and the bottom face 52 of the collimation subassembly 5B meet at a third edge 29, and the bottom face 262 of the coupling portion 26 and the bottom face 42 of the output portion 4 meet at a fourth edge The third edge 29 forms a straight segment.

The top face 261 of the coupling portion 26 is offset relative to the bottom face 262 of the coupling portion 26. The first edge 27 and the third edge 29 are included in one and the same plane that is inclined relative to the collimation subassembly, which is not represented. The second edge 28 and the fourth edge 30 are included in one and the same cylinder, which is not represented, defined by a translational generatrix on a directrix, the generatrix being a straight line secant to the collimation subassembly and the directrix being the second edge.

The first edge 27 defines the apex of an angle formed by the top face 261 of the coupling portion 26 and the top face 51 of the collimation subassembly 5B. This angle is equal to 145°.

The second edge 28 defines the apex of an angle formed by the top face 261 of the coupling portion 26 and the top face 41 of the output portion 4. This angle is equal to 145°.

The third edge 29 defines the apex of an angle formed by the bottom face 262 of the coupling portion 26 and the bottom face 52 of the collimation subassembly 5B. This angle is equal to 145°.

The fourth edge 30 defines the apex of an angle formed by the bottom face 262 of the coupling portion 26 and the bottom face 42 of the output portion 4. This angle is equal to 145°.

While the system herein described, and the forms of apparatus for carrying this system into effect, constitute preferred embodiments of this invention, it is to be understood that the invention is not limited to this precise system and forms of apparatus, and that changes may be made in either without departing from the scope of the invention, which is defined in the appended claims.

What is claimed is:

1. A light guide for an optical device, notably for lighting and/or signaling, comprising:
    at least one light output portion having a top face and a bottom face linked together by a light output rim,
    at least one collimation subassembly suitable for receiving light emitted by a light source and for directing at least a part of this light toward the light output portion, the collimation subassembly having a top face and a bottom face linked together by a collimation rim, and a coupling portion coupling the light output portion to the subassembly, the coupling portion having a coupling portion top face and a coupling portion bottom face, wherein the bottom and top faces of the collimation subassembly extend substantially in mutually parallel planes, and in that the coupling portion top face of the coupling portion and at least one of the top face of the collimation subassembly and of the top face of the light output portion meet at an edge;

wherein said collimation rim is at least partially curved or arcuate and said coupling portion facilitates enhancing a uniform distribution of light through said light output rim, wherein the guide further comprises:
a plurality of collimation subassemblies,
a single light output portion, and
a plurality of coupling portions,
each coupling portion coupling one of the collimation subassemblies to the light output portion.

2. The light guide according to claim 1, wherein, when a light ray arrives on the coupling portion bottom face of the coupling portion with a given direction of incidence, the coupling portion top face and coupling portion bottom face of the coupling portion are arranged in such a way as to reflect this ray, notably by total internal reflection, toward the light output portion in a direction of reflection substantially parallel to the given direction of incidence.

3. The light guide according to claim 1, wherein, when a light ray arrives on the coupling portion top face of the coupling portion with a given direction of incidence, the coupling portion top face and coupling portion bottom face of the coupling portion are arranged so that when said ray is incident on said coupling portion bottom face it lies in a direction of incidence that is generally parallel to a direction of said ray after it is reflected by both said coupling portion top face and coupling portion bottom face, notably by total internal reflection, toward the light output portion in a direction of reflection substantially parallel to the given direction of incidence on said coupling portion bottom face.

4. The light guide according to claim 1, wherein the coupling portion top face of the coupling portion and the top face of the collimation subassembly meet at a first edge, and in that the coupling portion top face of the coupling portion and the top face of the light output portion meet at a second edge.

5. The light guide according to claim 4, wherein at least one of:
the first edge defines the apex of an angle formed by the coupling portion top face of the coupling portion and the top face of the collimation subassembly, this angle being between 130° and 160°; or
the second edge defines the apex of an angle formed by the coupling portion top face of the coupling portion and the top face of the output portion, this angle being between 130° and 160°.

6. The light guide according to claim 5, wherein at least one of the angles is 135°.

7. The light guide according to claim 1, wherein the coupling portion bottom face of the coupling portion and the bottom face of the collimation subassembly meet at a third edge, and in that the coupling portion bottom face of the coupling portion and the bottom face of the output portion meet at a fourth edge.

8. The light guide according to claim 7, wherein at least one of:

the third edge defines the apex of an angle formed by the coupling portion bottom face of the coupling portion and the bottom face of the collimation subassembly, this angle being between 130° and 160°; or
the fourth edge defines the apex of an angle formed by the coupling portion bottom face of the coupling portion and the bottom face of the output portion, this angle being between 130° and 160°.

9. The light guide according to claim 8, wherein at least one of the angles is 135°.

10. The light guide according to claim 1, wherein the coupling portion bottom face of the coupling portion is, over its entire surface, facing the coupling portion top face of the coupling portion.

11. The light guide according to claim 1, wherein the coupling portion top face of the coupling portion is offset relative to the coupling portion bottom face of the coupling portion.

12. The light guide according to claim 1, wherein the bottom face of the collimation subassembly is a light input face suitable for receiving light emitted by a light source.

13. The light guide according to claim 12, wherein the collimation subassembly comprises collimation means for directing at least a part of the light originating from the bottom face of the collimation subassembly toward the coupling portion.

14. The light guide according to claim 13, wherein, when rays (R) are emitted from a predetermined point relative to the guide, pass through the input face and arrive on these collimation means, the collimation means are arranged to direct, directly or indirectly, a majority, notably all, of these rays toward the coupling portion in the form of a beam with parallel rays (R1, R2, R3).

15. The light guide according to claim 1, wherein the light output portion forms a guiding sheet arranged to guide, toward the output rim, light coming from the coupling portion and being propagated in the sheet, notably by total internal reflection.

16. The light guide according to claim 1, wherein the light output portion has a curved form.

17. The light guide according to claim 1, wherein the top face of the light output portion and the light output rim meet at a top output rim edge, in that the bottom face of the light output portion and the output rim meet at a bottom output rim edge, the top output rim edge and/or the bottom output rim edge having a curved and smooth, that is to say unbroken, profile.

18. The light guide according to claim 1, wherein at least a part of the bottom faces of the collimation subassemblies extends in one and the same first plane (P1) and that at least one other part of the bottom faces of the collimation subassemblies extends in one and the same second plane (P2, P3), the first and second planes being distinct.

19. An optical device, notably for a motor vehicle, such as a lighting or signaling or interior lighting device, comprising:
at least one light source, notably a light-emitting diode,
at least one light guide according to claim 1,
the light source being arranged to light the light guide.

20. The optical device according to claim 19, wherein the device comprises a plurality of light sources arranged to light the light guide, the light guide comprising a plurality of collimation subassemblies, each light source being associated with a different subassembly.

* * * * *

UNITED STATES PATENT AND TRADEMARK OFFICE
CERTIFICATE OF CORRECTION

PATENT NO. : 9,557,024 B2  
APPLICATION NO. : 14/091536  
DATED : January 31, 2017  
INVENTOR(S) : Syvain Giraud Page 1 of 1

It is certified that error appears in the above-identified patent and that said Letters Patent is hereby corrected as shown below:

In the Specification

Column 8, Line 19, insert --28.-- after "edge".
Column 8, Line 25, insert --30.-- after "edge".

Signed and Sealed this
Eighteenth Day of April, 2017

Michelle K. Lee
*Director of the United States Patent and Trademark Office*